(12) United States Patent
Rabaut et al.

(10) Patent No.: US 11,846,267 B2
(45) Date of Patent: Dec. 19, 2023

(54) DEVICE AND METHOD FOR UPENDING A TUBULAR ELEMENT WITH A LONGITUDINAL DIRECTION AT AN OUTER END

(71) Applicant: DEME Offshore BE NV, Zwijndrecht (BE)

(72) Inventors: Dieter Wim Jan Rabaut, Ghent (BE); Kenneth Gerard Vannieuwenhuyse, Sint-Amandsberg (BE); Jan Maria Koen Michielsen, Antwerp (BE)

(73) Assignee: DEME Offshore BE NV, Zwijndrecht (BE)

( * ) Notice: Subject to any disclaimer, the term of this patent is extended or adjusted under 35 U.S.C. 154(b) by 130 days.

(21) Appl. No.: 17/262,832

(22) PCT Filed: Jul. 22, 2019

(86) PCT No.: PCT/EP2019/069671
§ 371 (c)(1),
(2) Date: Jan. 25, 2021

(87) PCT Pub. No.: WO2020/020819
PCT Pub. Date: Jan. 30, 2020

(65) Prior Publication Data
US 2021/0301790 A1    Sep. 30, 2021

(30) Foreign Application Priority Data
Jul. 26, 2018 (BE) .................................. 2018/5539

(51) Int. Cl.
*F03D 13/10* (2016.01)
*F03D 13/25* (2016.01)
*B66C 1/10* (2006.01)

(52) U.S. Cl.
CPC .............. *F03D 13/10* (2016.05); *B66C 1/108* (2013.01); *F03D 13/25* (2016.05); *F05B 2230/61* (2013.01); *F05B 2240/95* (2013.01)

(58) Field of Classification Search
CPC ......... E04H 12/345; B66C 13/08; B66C 1/54; B66C 1/56; B66C 1/108; F05B 2230/61; F05B 2240/95; F03D 13/25; F03D 13/10
See application file for complete search history.

(56) References Cited

U.S. PATENT DOCUMENTS 10,239,733 B2    3/2019 Belder et al.
2015/0308069 A1   10/2015 Mulderij
2021/0253403 A1*   8/2021 Van Vessem ........... B66C 1/108

FOREIGN PATENT DOCUMENTS

EP    2873641 A1 *  5/2015  ............. B66C 1/108
FR    2382396 A1    9/1978
(Continued)

*Primary Examiner* — Moshe Wilensky
(74) *Attorney, Agent, or Firm* — THE WEBB LAW FIRM

(57) ABSTRACT

Described herein is a device for upending a tubular element with a longitudinal direction at an outer end. The device has a cross-shaped support structure of mutually coupled beams. The support structure is pivotable round a lifting member connected thereto for connection to a lifting means such as a crane. Clamping members slidable along the beams from a clear position to a clamping position can provide for coupling to a wall part of the outer end of the tubular element in the clamping position. In the clamping position the beams extend substantially transversely of the longitudinal direction of the tubular element. Also described herein is a method which makes use of the device.

21 Claims, 5 Drawing Sheets

(56) References Cited

FOREIGN PATENT DOCUMENTS

| GB | 2429966 A | 3/2007 |
| WO | 2014084738 A1 | 6/2014 |
| WO | 2016184905 A1 | 11/2016 |

* cited by examiner

DEVICE AND METHOD FOR UPENDING A TUBULAR ELEMENT WITH A LONGITUDINAL DIRECTION AT AN OUTER END

CROSS-REFERENCE TO RELATED APPLICATIONS

This application is the United States national phase of International Application No. PCT/EP2019/069671 filed Jul. 22, 2019, and claims priority to Belgian Patent Application No. 2018/5539 filed Jul. 26, 2018, the disclosures of which are hereby incorporated by reference in their entirety.

BACKGROUND OF THE INVENTION

Field of the Invention

The invention relates to a device and method for upending a tubular element with a longitudinal direction at an outer end. The invention relates particularly to a device and method for upending a foundation pile of a wind turbine to be placed on an underwater bottom and/or a wind turbine tower to be placed on an already installed foundation from a vessel at an outer end. The foundation can here comprise a so-called monopile foundation or a so-called jacket foundation.

Description of Related Art

The invention will be elucidated with reference to an offshore wind turbine. This reference does not however imply that the invention is limited thereto, and the device and method can be applied equally well for placing any other tubular element on any ground surface. It is thus for instance possible to apply the invention in the context of arranging other offshore foundation structures, of jetties, radar and other towers, and also for onshore applications.

Foundation piles of an offshore wind turbine in many cases comprise hollow tubular elements of steel or concrete which can have lengths of more than 100 m, a diameter of 6 m and more, and a weight which can rise to 800-2300 tons and more. Foundations for wind turbines are moreover becoming increasingly heavier because wind turbines are constantly being scaled up. Because the foundations are becoming increasingly more sizeable, they are increasingly more difficult to handle.

A known method for placing a foundation pile on an underwater bottom comprises of taking up the foundation pile from a vessel with a lifting means such as a lifting crane and lowering the foundation pile onto or into the underwater bottom. The foundation pile is then uncoupled from the lifting means.

Taking up of a foundation pile is a delicate operation, among other reasons because the foundation pile can easily become damaged herein. It is important here to consider that the foundation pile may protrude over the deck of a vessel over a large distance, and that distances between a device for take-up and the foundation pile are generally very small relative to for instance the diameter of the foundation pile, so that undesired contact between a device for take-up and wall parts of the foundation pile can easily occur. Various operators are furthermore active in operation of the tools used, such as the lifting crane, winches provided on the deck of the vessel, and the like.

A drawback of the known device is that there is a high chance of damage to a tubular element to be upended, such as a foundation pile. The known device is also only able to perform its function when the sea is relatively calm, and is generally only suitable for a limited diameter range.

SUMMARY OF THE INVENTION

An object of the present invention is therefore to provide a device and method for upending a tubular element with a longitudinal direction at an outer end, which help to at least partially obviate the above stated prior art drawbacks. The invention particularly seeks to provide an improved device and method for upending a tubular element with a longitudinal direction, particularly a foundation pile of a wind turbine to be placed on an underwater bottom, at an outer end.

According to the invention, a device is provided for this purpose. The device comprises a cross-shaped support structure of mutually coupled beams; a lifting member, connected pivotally to the support structure, for connection to a lifting means such as a crane; and clamping members slidable along the beams from a clear position to a clamping position for coupling to a wall part of the outer end of the tubular element in the clamping position, in which clamping position the beams extend substantially transversely of the longitudinal direction of the tubular element.

The coupling of the slidable clamping members to a wall part of the tubular element can in principle comprise any type of coupling. Suitable couplings for instance comprise a friction coupling or a flange coupling, or a combination of the two. A friction coupling is based on generating friction forces between surfaces of a clamping member and a relevant wall part on which the clamping member engages by pressing the two surfaces together. A flange coupling is based on a clamping member engaging on the underside of a flange of the tubular element.

The device, and more particularly the slidable clamping members thereof, ensure that a tubular element can be taken up and upended, particularly from a rocking vessel, with less chance of damage. The invented device further allows a great variety in the dimensions, more particularly the diameter, of tubular elements to be upended.

Another aspect of the invention relates to a method for upending a tubular element with a longitudinal direction at an outer end. The method comprises the steps of:
  providing a device according to any one of the foregoing disclosures;
  taking up the support structure by the lifting member using a lifting means;
  carrying the device to an outer end of the tubular element;
  sliding the clamping members along the beams from a clear position to a clamping position for coupling to a wall part of the outer end of the tubular element in the clamping position, in which clamping position the beams extend substantially transversely of the longitudinal direction of the tubular element;
  upending the tubular element coupled to the device, wherein the support structure pivots relative to the lifting member;
  lifting the tubular element coupled to the device into a desired position; and
  sliding the clamping members along the beams from the clamping position to the clear position in order to uncouple the device from the tubular element.

A peripheral part of the element is engaged by the clamping members with a suitable clamping tension during upending of the element. Because the clamping members are for instance situated relatively close to the centre of the cross-shaped support structure during insertion of the device into a hollow outer end of the tubular element, damage is less likely to be done. This also makes it possible, if desired, to work in a heavier swell than is possible with the prior art method.

In an embodiment of the invention the clamping members are slidable from the clear position to a clamping position, located further away from a centre of the cross of the support structure than the clear position, for coupling to an internal wall part of a hollow outer end of the tubular element. Providing the option of sliding the clamping members from the clear position to the clamping position enables tubular elements of varying diameters to be engaged and upended without the device having to be modified for this purpose. The device particularly enables tubular elements with relatively large diameters to be upended. In the context of the present application relatively large diameter is understood to mean a diameter greater than 6 m, more preferably greater than 7 m, still more preferably greater than 8 m, still more preferably greater than 9 m, and most preferably greater than 10 m.

An embodiment of the device according to the invention is characterized in that the clamping members are slidable from the clear position to a clamping position, located further away from a centre of the cross of the support structure than the clear position, for coupling to an internal wall part of a hollow outer end of the tubular element.

Yet another embodiment provides a device which further comprises support members, connected to the beam, for a wall part of the tubular element. Such members can be helpful in supporting a tubular element while it is being upended counter to the force of gravity. The support members are preferably applied for upending tubular elements with a relatively large diameter, and are instrumental in avoiding overload of the tubular element.

In an embodiment the support members are connected to the beam at adjustable predetermined positions of the beam. Adjustable yet predetermined positions can for instance be formed by pin-hole connections between the support members and the relevant beam of the support structure.

An improved embodiment of the invention relates to a device wherein the support members are configured to support an outer wall part of the tubular element.

A further improved embodiment of the invention relates to a device, this further comprising here a support structure differing from the support members and extending at least along a part of the periphery of the tubular element, for instance along half or a quarter of the periphery. The support structure is preferably connected to at least two beams of the cross-shaped support structure.

In another embodiment of the invention the device further comprises means for adjusting the angular position of the support structure relative to the lifting member which is pivotally coupled to the support structure. This makes it possible to adjust the angular position of the support structure. The support structure can here be moved from an insertion position, in which position the device can be coupled to a tubular structure, to a lifting position, in which the tubular element is in (partially) upended position and, finally, in a position in which it hangs vertically.

The angle adjusting means can be embodied in any known manner, wherein an embodiment in which the angle adjusting means comprise a hydraulic piston cylinder extending between the lifting member and the support structure is preferred.

The clamping members of the support structure can in principle be situated on an upper or lower side, or both sides of the support structure. A practical embodiment relates to a device wherein the lifting member is situated on an upper side of the cross-shaped support structure for connection to the lifting means, and the clamping members are slidable along a lower side of the support structure.

The clamping members of the support structure can in principle be slidable along the beams of the support structure in any manner known to the skilled person. A relatively low-maintenance embodiment relates to a device wherein the clamping members are slidable by means of hydraulic piston cylinders extending between a clamping member and the support structure.

Because the device has for its object to at least partially prevent damage to tubular elements to be upended at sea, another embodiment of the invention is formed by a device wherein surfaces which can come into contact with wall parts of the tubular element are provided with shock-absorbing elements such as rubber covering. These surfaces can for instance be end surfaces of the clamping members, of the support members and/or of the support structure in some embodiments.

According to the invention, the support structure is cross-shaped, which is understood to mean a structure comprising a number of arms extending from a centre. The number of arms can be chosen at random, although a cross-shaped support structure which is X-shaped is preferred. Such a support structure has respectively 4 or 3 arms.

The device is particularly suitable for upending tubular elements of a relatively large size, for instance with diameters of 6 m and more, and with lengths which can amount to 80 m and more. An embodiment provides for this purpose a device, this further comprising here a lifting means carried by a carrier structure for taking up the support structure by the lifting member. A suitable lifting means comprises a lifting crane of any known type. The support structure for the lifting means can comprise a ground surface, soil, a concrete plate and so on.

The device is particularly suitable for upending tubular elements offshore, for which purpose the device comprises according to an embodiment a floating vessel as carrier structure. In this embodiment the device is manipulated from a work deck of a vessel, for instance a jack-up platform. The advantages of the invention are most clearly manifest when the support structure comprises a floating vessel suitable for lifting heavy objects.

The advantages of the device according to the invention are most clearly manifest in an embodiment wherein the tubular element is a foundation pile of a wind turbine and/or a wind turbine tower to be placed on an already installed foundation.

With the device a tubular element with a longitudinal direction can be upended at an outer end thereof with a reduced chance of damage. An embodiment of the invented device is provided here; the support structure is taken up by the lifting member of the support structure using a lifting means; the device is carried to an outer end of the tubular element; the clamping members are slid along the beams from a clear position to a clamping position, whereby they couple to a wall part of the outer end of the tubular element in the clamping position; and the tubular element coupled to the device is upended, wherein the support structure pivots relative to the lifting member. After the tubular element coupled to the device has been brought in hanging position into a desired position, the clamping members are slid along the beams from the clamping position to the clear position in order to uncouple the device from the tubular element.

In an embodiment of this method the support structure is actively pivoted relative to the lifting member using the angle adjusting means, particularly in order to move the support structure to an insertion position suitable for the position of a tubular element to be taken up.

In order to allow tubular elements with both relatively small and relatively large diameters to be upended, in an embodiment of the method the distance from the clear position to the clamping position is adjusted in accordance with the diameter of the tubular element. A corresponding embodiment of the device, which enables this, is provided for this purpose.

Another aspect of the invention relates to an assembly of a device according to any one of the described embodiments and a tubular element coupled to such a device.

The embodiments of the invention described in this patent application can be combined in any possible combination of these embodiments, and each embodiment can individually form the subject-matter of a divisional patent application.

BRIEF DESCRIPTION OF THE DRAWINGS

The invention will now be further elucidated on the basis of the following figures, without otherwise being limited thereto. In the figures.

DETAILED DESCRIPTION OF THE INVENTION

Figure 1:
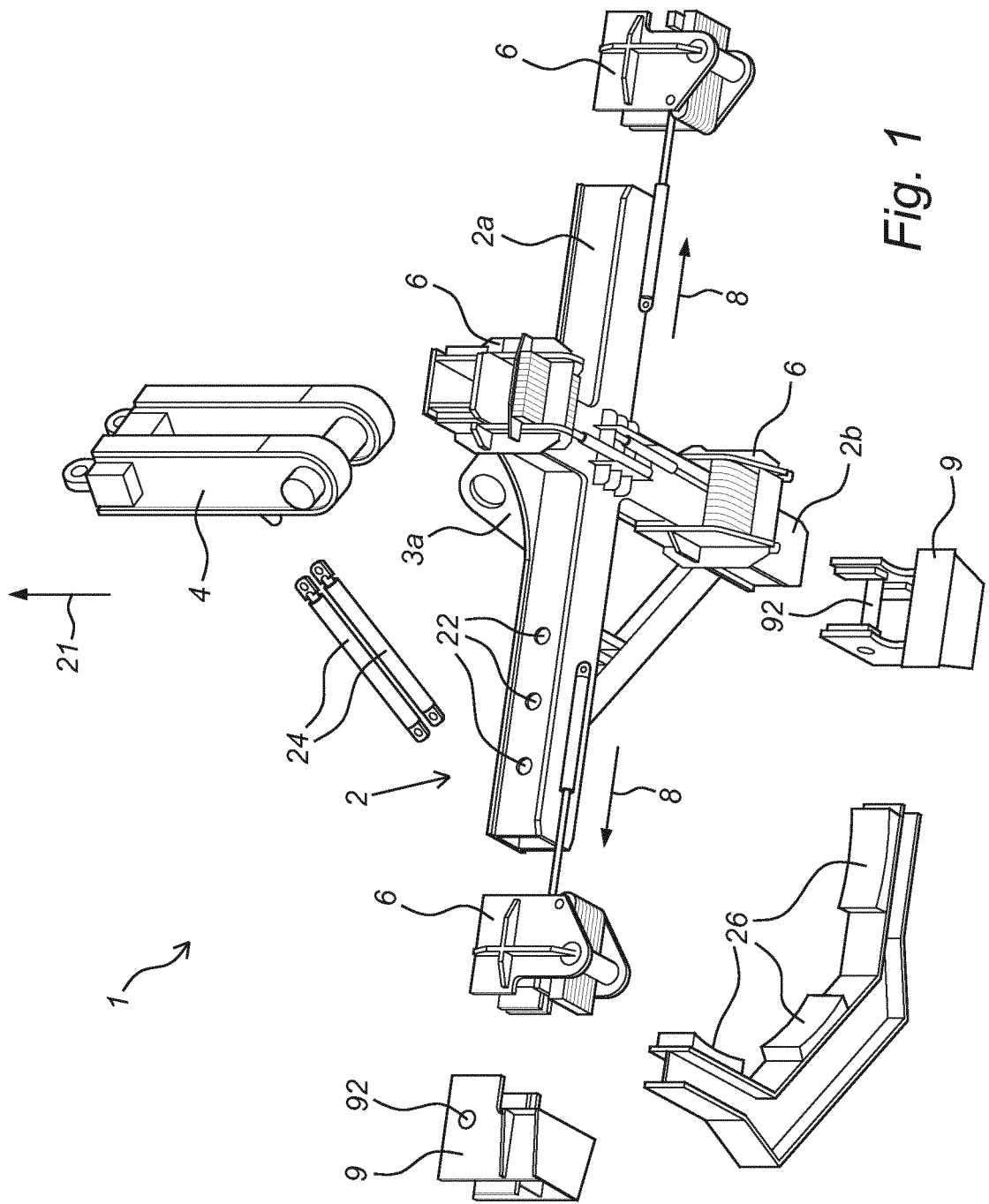
FIG. 1 is a schematic perspective exploded view of the device according to an embodiment of the invention.

Referring to the figures, a device 1 for upending a foundation pile 20 with a longitudinal direction at an outer end is shown. Device 1 is likewise suitable for upending and placing other elements with a longitudinal direction, such as for instance transition pieces of a wind turbine mast, optionally on each other or on another surface. In the shown embodiment device 1 comprises a cross-shaped support structure in the form of mutually coupled beams (2a, 2b). The coupling can for instance be brought about by means of welding of beam parts. The beams for instance have a tubular cross-section, although H-beams or I-beams are also possible. In the centre of the cross the support structure is provided with two hinged plates (3a, 3b) in which a lifting member 4 is connected pivotally to support structure 2 by means of a pin-hole connection. Lifting member 4 is provided on a lifting side with lifting eyes 40 for connection to a lifting means such as a crane (not shown), this with interposing of hoisting cables which each engage in a lifting eye 40. The function of lifting eye 40 can also take a different form, for instance that of shaft stub or trunnion. With lifting member 4 device 1 can be suspended from a lifting means in a manner such that support structure 2 can rotate in relatively unhindered manner round a rotation axis 5 running perpendicularly of the hinged plates (3a, 3b).

Figure 2:
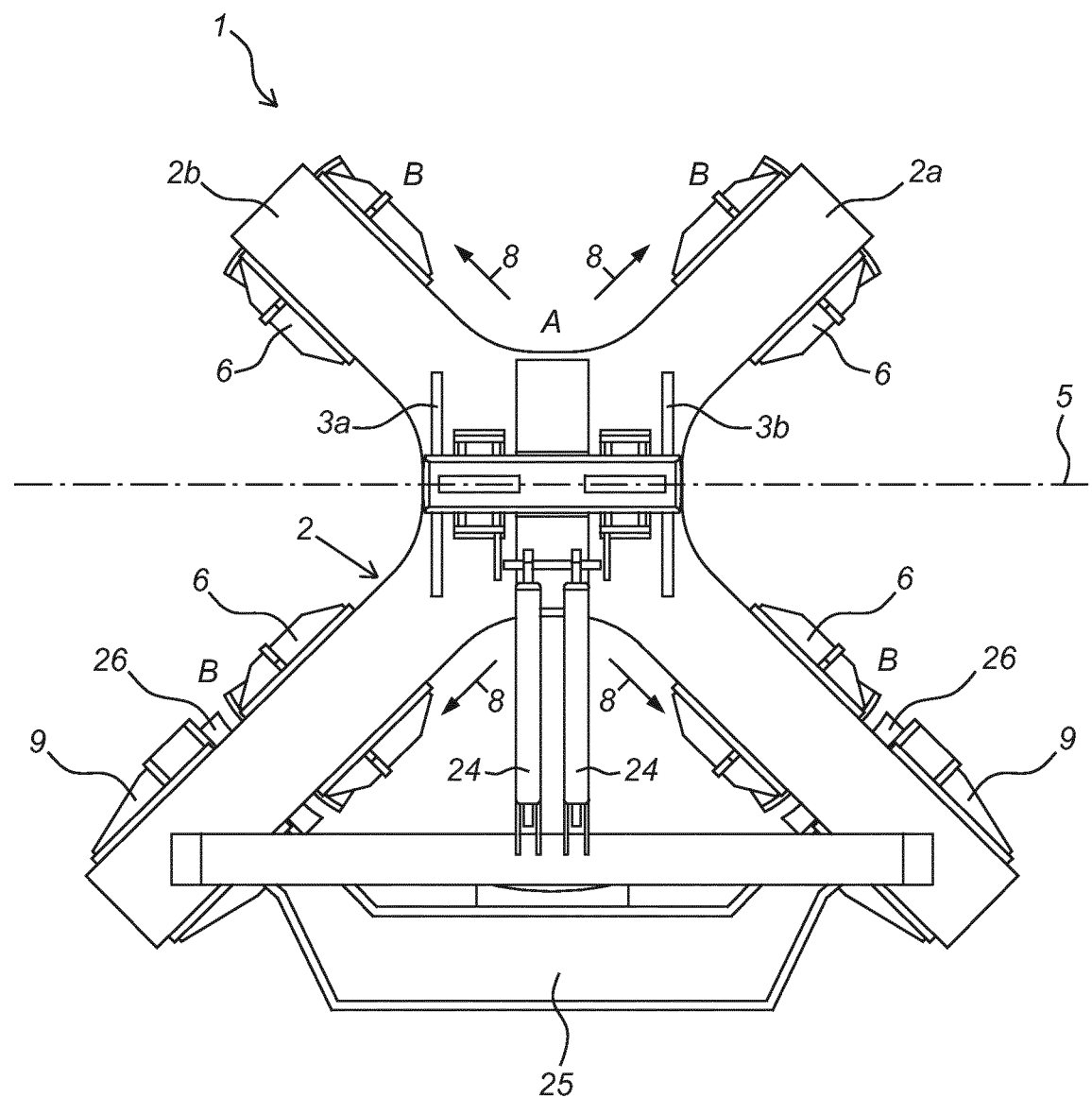
FIG. 2 is a schematic top view in assembled state of the embodiment shown in FIG. 1.
Figure 3:
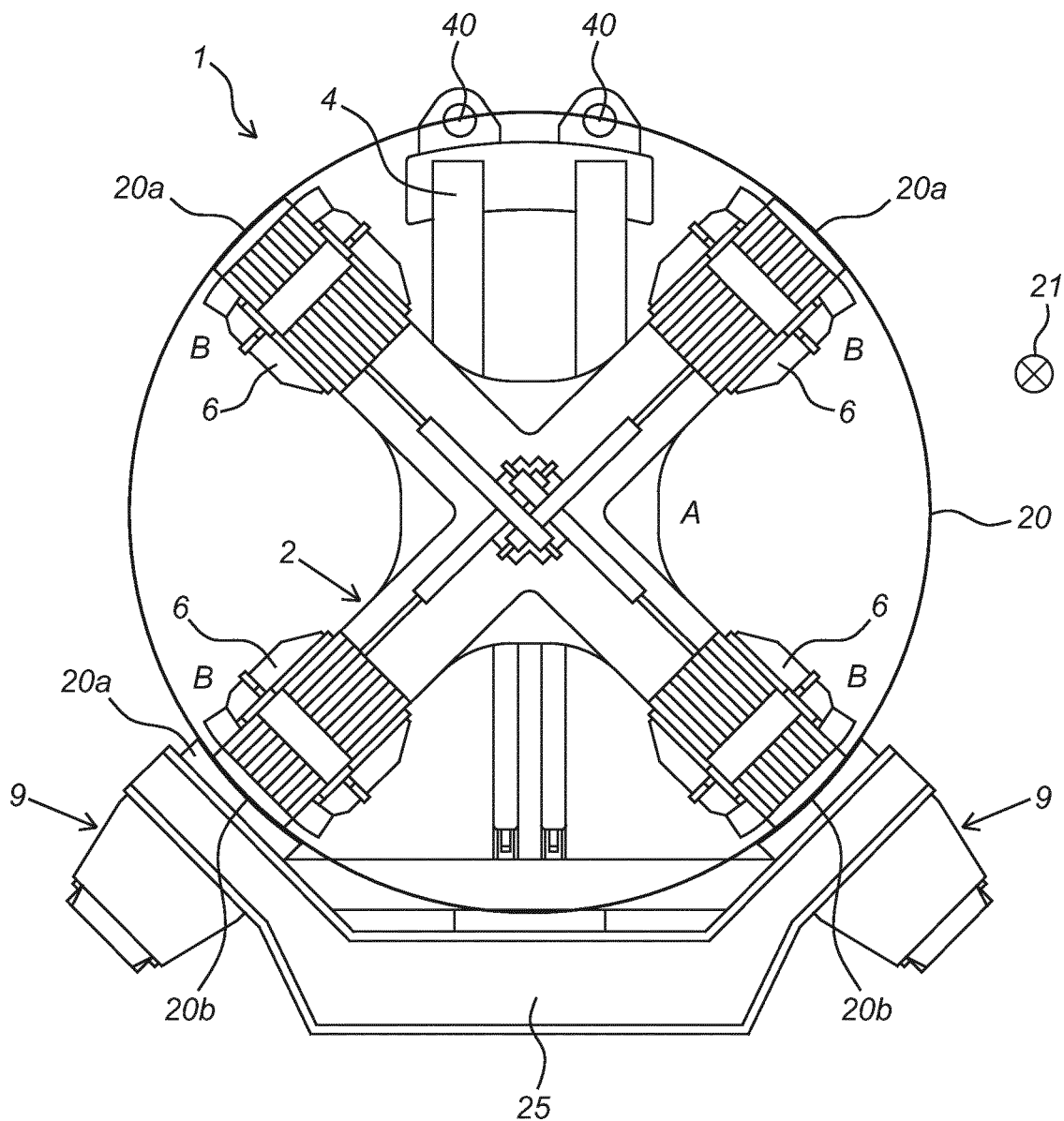
FIG. 3 is a schematic bottom view of the embodiment of the device according to the invention shown in FIG. 1 with a tubular element coupled thereto.

Device 1 further comprises clamping members 6 slidable along the beams (2a, 2b) from a clear position to a clamping position. Each camping member 6 has a U-shaped cross-section and can in this way at least partially enclose a beam (2a, 2b) so that clamping member 6 is able to slide with sliding surfaces over the relevant beam (2a, 2b) without losing contact with the beam (2a, 2b). In the shown embodiment clamping members 6 are slidable along a lower side of support structure 2. The lower side of support structure 2 is defined here as the side where lifting member 4 is not situated. This lifting member 4 is situated on an upper side of the cross-shaped support structure 2. Clamping members 6 can be slid over the beams (2a, 2b) by means of hydraulic piston cylinders 7 extending between a relevant clamping member 6 and a beam of support structure 2. By imparting on the cylinders a radially outward movement in the indicated direction 8 as according to FIG. 2 the clamping members 6 are moved from a clear position A lying radially relatively close to the centre of the cross to a clamping position B located further away from the centre of the cross of the support structure. As shown in FIG. 3, in the clamping position B clamping members 6 lie under pressure against internal wall parts 20a of a hollow outer end of foundation pile 20. This results in a coupling between end surfaces of clamping members 6 and the internal wall parts 20a of foundation pile 2. In order to further improve this coupling the end surfaces of clamping members 6 which come into contact with wall parts 20a can be provided with shock-absorbing elements such as rubber covering. The figures further show that in the clamping position of clamping members 6 the beams (2a, 2b) extend substantially transversely of a longitudinal direction 21 of foundation pile 20. In FIG. 3 the longitudinal direction 21 runs perpendicularly of the plane of the figure.

Device 1 is further provided with support members 9 connected to a beam (2a, 2b). Support members 9 are configured to support outer wall parts 20b of foundation pile 20, at least along parts of the periphery of foundation pile 20. Support members 9 likewise have a U-shaped cross-section and can be slid over end parts of the beams (2a, 2b) to an adjustable predetermined position of the relevant beam (2a, 2b). The adjustable predetermined positions are for instance determined by a number of openings 22 which are arranged in a side wall of a beam (2a, 2b) and in which a corresponding pin 92 of a support member 9 can be arranged in order to secure this member to the beam (2a, 2b). Because support members 9 are configured to support an outer wall part 20b of foundation pile 20 during upending, support members 9 will generally be situated more radially outward in the radial direction 8 than clamping members 6, which are after all configured in the shown embodiment to clamp an inner wall part 20a of foundation pile 20 during upending.

For foundation piles 20 with relatively large diameters, for instance of 6 m and more, and/or a relatively high weight, for instance 800-2300 tons and more, it may be useful to provide further support in the form of a support structure 25, which differs from support members 9 and extends along at least a part 23 of the periphery of foundation pile 20. In order to obtain sufficient strength it may be useful to connect support structure 25 to at least two beams (2a, 2b), as shown in FIGS. 2 and 3. The surfaces of support structure 25 which can come into contact with wall parts of foundation pile 20 can also be provided with shock-absorbing elements 26, for instance in the form of rubber covering.

During use, when foundation pile 20 is being upended, both support members 9 and support structure 25 are situated on a lower side of foundation pile 20 in partially upended position. Support members 9 and, if desired, support structure 25, are therefore particularly useful in absorbing the own weight of foundation pile 20.

Figure 4:
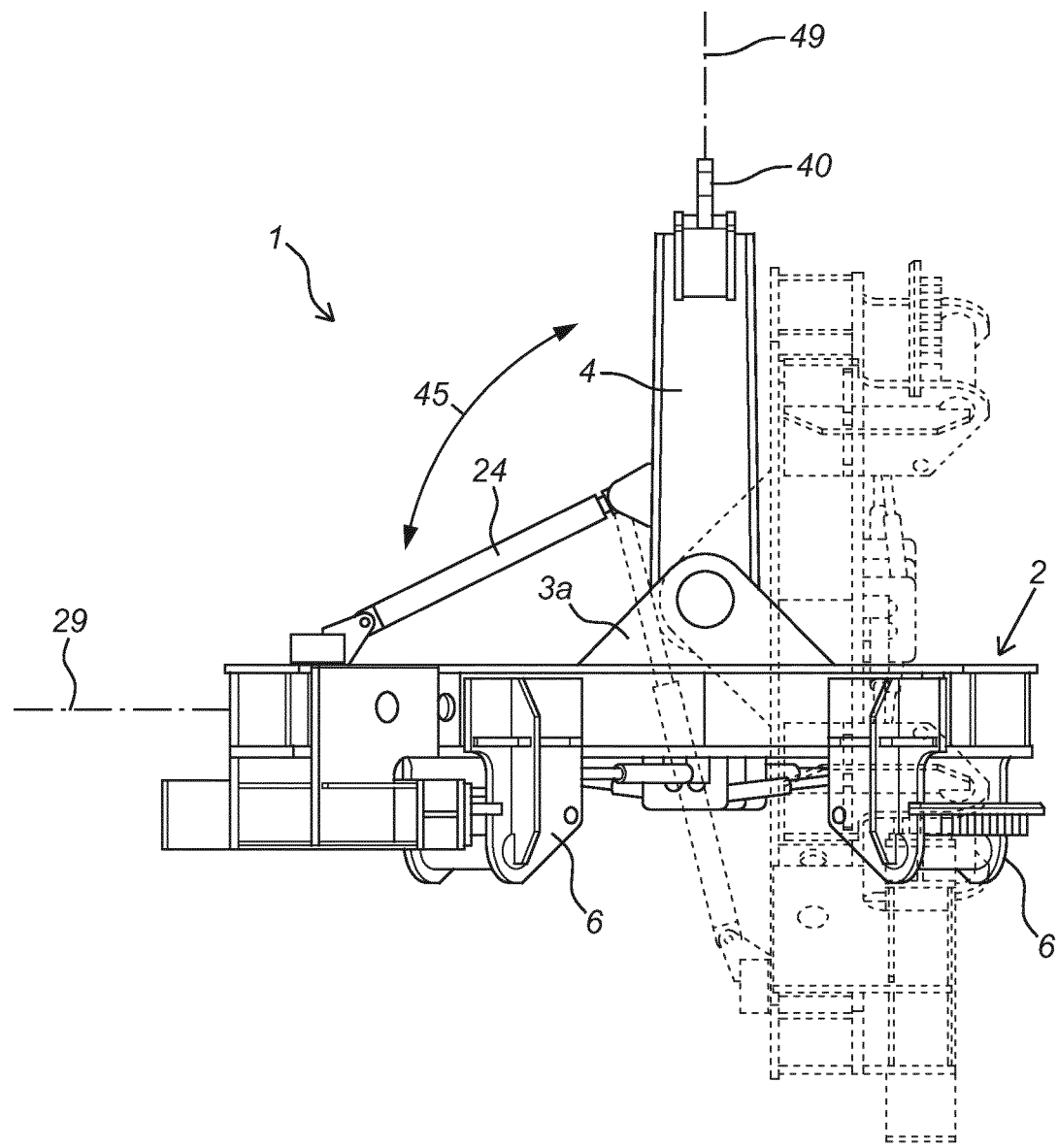
FIG. 4 is a schematic side view of the embodiment of the device according to the invention shown in FIG. 1 in two angular positions; and, finally
Figure 5:
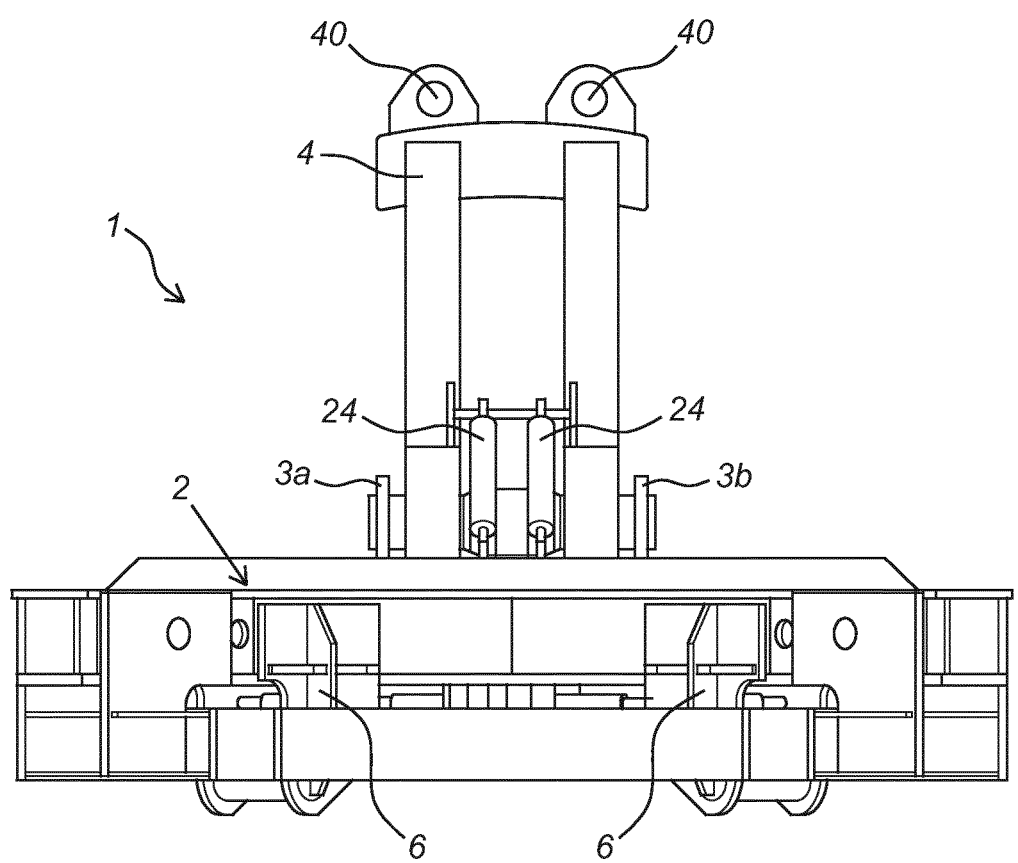
FIG. 5 is a schematic front view of the embodiment of the device according to the invention shown in FIG. 1.

Finally, device 1 is also provided with means for adjusting the angular position of support structure 2 relative to the lifting member 4 which is connected pivotally to support structure 2. In the shown embodiment the angle adjusting means comprise hydraulic piston cylinders 24 extending between lifting member 4 and support structure 2. In the retracted position of cylinders 24, shown in FIG. 4, the plane 29 of support structure 2 runs substantially perpendicular to the plane 49 of lifting member 4. In this lifting position the angle 45 between the two planes of lifting member 4 and support structure 2 amounts to substantially 90 degrees. By imparting a movement on cylinders 24 the support structure 2 is rotated round rotation axis 5 to an insertion position, shown with broken lines in FIG. 4, in which plane 29 of support structure 2 runs substantially parallel to the plane of lifting member 4. The angle 45 between lifting member 4 and support structure 2 has here increased to about 180 degrees.

During use the invented device 1 is firstly connected to a hoisting cable (not shown) of a crane (not shown) by connecting the hoisting cable to the eyes 40 or alternative connecting means of lifting member 4. Support structure 2 is then taken up by lifting member 4 using the crane and carried to an outer end of foundation pile 20. Foundation piles 20 which have to be upended and for instance have to be arranged in a seabed are generally situated on the work deck of a vessel, for instance a jack-up platform, in horizontal position. In order to lift such a horizontally oriented foundation pile 20 with device 1 the support structure 2 of the device is moved into the insertion position shown with broken lines in FIG. 4, and inserted into a hollow outer end of foundation pile 20, by imparting a movement on cylinders 24. Clamping members 6 are here in the clear position A, i.e. relatively close to the centre of the cross. Damage to wall parts of foundation pile 20 is prevented in this way. Clamping members 6 are then slid along the beams (2a, 2b) from their clear position A to their clamping position B, wherein a coupling with the internal wall parts 20a of the hollow outer end of foundation pile 2 is realized. In this clamping position the beams (2a, 2b) extend substantially transversely of the longitudinal direction of foundation pile 20. The foundation pile 20 coupled to device 1 is then upended by hoisting the whole with the crane. Support structure 2 here pivots relative to lifting member 4 until angle 45 has been reduced to 90 degrees, in other words until plane 29 of support structure 2 runs substantially perpendicular to plane 49 of lifting member 4. In this position the foundation pile 20 coupled to device 1 is hoisted with the crane into a desired position, for instance there where foundation pile 20 has to be lowered onto the seabed. In the desired position clamping members 6 are then slid radially inward along the beams (2a, 2b) from clamping position B to clear position A in order to uncouple device 1 from foundation pile 20. During upending of foundation pile 20 it can if desired be supported further by support members 9 and/or support structure 25.

It will be apparent that the above described embodiments have to be provided with peripheral equipment, such as for instance hydraulic and electric power sources, supply conduits therefor, and the like. This peripheral equipment is not described in further detail.

With the embodiment of the invented device, described above in detail, a tubular object, particularly a foundation pile of a wind turbine, can be placed from a floating vessel onto a ground surface, particularly an underwater bottom, this in worse weather conditions than is possible with the known method. This reduces the risk of damage to the tubular object. The device also makes it possible to manipulate tubular elements with relatively large dimensions, wherein different dimensions can be accommodated.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A device for upending a tubular element with a longitudinal direction at an outer end, wherein the device comprises:
   a cross-shaped support structure of mutually coupled beams;
   a lifting member, connected pivotally to the support structure, for connection to a lifting means; and
   clamping members slidable along the beams from a clear position to a clamping position for coupling to a wall part of the outer end of the tubular element in the clamping position, in which clamping position the beams extend transversely of the longitudinal direction of the tubular element,
   wherein the clamping members are slidable from the clear position to the clamping position, located further away from a centre of the cross of the support structure than the clear position, for coupling to an internal wall part of a hollow outer end of the tubular element,
   wherein the device further comprises support members, connected to the beams, for a wall part of the tubular element,
   wherein the support members are configured to support an outer wall part of the tubular element, and a support structure differing from the support members and from the cross-shaped structure and extending at least along a part of a periphery of the tubular element, and
   wherein the support structure is connected to at least two beams of the cross-shaped support structure.

2. The device according to claim 1, wherein the support members are connected to the beams at adjustable predetermined positions of the beam.

3. The device according to claim 2, further comprising means for adjusting the angular position of the support structure relative to the lifting member which is pivotally coupled to the support structure.

4. The device according to claim 2, wherein the lifting member is situated on an upper side of the cross-shaped support structure for connection to the lifting means, and the clamping members are slidable along a lower side of the support structure.

5. The device according to claim 1, further comprising means for adjusting the angular position of the cross-shaped support structure relative to the lifting member which is pivotally coupled to the cross-shaped support structure.

6. The device according to claim 5, wherein the angle adjusting means comprises a hydraulic piston cylinder extending between the lifting member and the support structure.

7. The device according to claim 5, wherein the lifting member is situated on an upper side of the cross-shaped support structure for connection to the lifting means, and the clamping members are slidable along a lower side of the support structure.

8. The device according to claim 1, wherein the lifting member is situated on an upper side of the cross-shaped support structure for connection to the lifting means, and the clamping members are slidable along a lower side of the support structure.

9. The device according to claim 1, wherein the clamping members are slidable by means of a hydraulic piston cylinders extending between a clamping member and the support structure.

10. The device according to claim 1, wherein surfaces, which can come into contact with wall parts of the tubular element, are provided with shock-absorbing elements.

11. The device according to claim 10, wherein with shock-absorbing element is a rubber covering.

12. The device according to claim 1, wherein the cross-shaped support structure is X-shaped.

13. The device according to claim 1, wherein the lifting means is carried by a carrier structure for taking up the support structure by the lifting member.

14. The device according to claim 13, wherein the carrier structure comprises a floating vessel.

15. The device according to claim 1, wherein the tubular element is a foundation pile of a wind turbine.

16. An assembly comprising a device according to claim 1 and a tubular element coupled to the device.

17. The device according to claim 1, wherein the lifting means comprises a crane.

18. The device according to claim 1, wherein the support structure extends at least along a part of an outer periphery of the tubular element, the outer periphery being a periphery opposing the internal wall part of the tubular element.

19. A method for upending a tubular element with a longitudinal direction at an outer end, wherein the method comprises the steps of:
providing a device according to claim 1;
taking up the support structure by the lifting member using a lifting means;
carrying the device to an outer end of the tubular element;
sliding the clamping members along the beams from a clear position to a clamping position for coupling to a wall part of the outer end of the tubular element in the clamping position, in which clamping position the beams extend substantially transversely of the longitudinal direction of the tubular element;
upending the tubular element coupled to the device, wherein the support structure pivots relative to the lifting member;
lifting the tubular element coupled to the device into a desired position; and
sliding the clamping members along the beams from the clamping position to the clear position in order to uncouple the device from the tubular element.

20. The method according to claim 19, wherein the support structure is actively pivoted relative to the lifting member using the angle adjusting means.

21. The method according to claim 19, wherein the distance from the clear position to the clamping position is adjusted in accordance with the diameter of the tubular element.

* * * * *